US006850673B2

(12) United States Patent
Johnston, II et al.

(10) Patent No.: US 6,850,673 B2
(45) Date of Patent: Feb. 1, 2005

(54) LIGHT SOURCE FOR FIBER OPTICS

(76) Inventors: Richard Fendall Johnston, II, 1851 N. Greenvalley Pkwy., No. 2912, Henderson, NV (US) 89014; Forrest Scott Healey, 1900 Villa Palms, No. 205, Las Vegas, NV (US) 89128

( * ) Notice: Subject to any disclaimer, the term of this patent is extended or adjusted under 35 U.S.C. 154(b) by 50 days.

(21) Appl. No.: 10/383,043

(22) Filed: Mar. 6, 2003

(65) Prior Publication Data

US 2003/0202361 A1 Oct. 30, 2003

Related U.S. Application Data

(60) Provisional application No. 60/362,304, filed on Mar. 7, 2002.

(51) Int. Cl.[7] .................................................. G02B 6/00
(52) U.S. Cl. ....................... 385/39; 385/147; 362/237; 362/295; 362/318; 362/551
(58) Field of Search .......................... 385/39, 115, 116, 385/134, 147; 362/27, 551–555, 227, 230, 240, 243, 257, 237, 295, 318, 560, 574

(56) References Cited

U.S. PATENT DOCUMENTS

| | | | |
|---|---|---|---|
| 5,302,999 A | 4/1994 | Oshida et al. ................. 355/1 |
| 5,803,575 A | 9/1998 | Ansems et al. ................ 362/32 |
| 5,838,860 A | 11/1998 | Kingstone et al. ........... 385/100 |
| 5,891,022 A * | 4/1999 | Pologe ........................ 600/323 |
| 5,924,978 A * | 7/1999 | Koeda et al. ................ 600/178 |
| 6,022,123 A | 2/2000 | Tomioka et al. ............. 362/244 |
| 6,208,782 B1 * | 3/2001 | Riddick et al. ................ 385/31 |
| 6,224,216 B1 * | 5/2001 | Parker et al. .................. 353/31 |
| 6,249,381 B1 | 6/2001 | Suganuma ................... 359/618 |
| 6,290,382 B1 | 9/2001 | Bourn et al. ................. 362/554 |
| 6,663,560 B2 * | 12/2003 | MacAulay et al. .......... 600/160 |
| 2001/0013973 A1 * | 8/2001 | Bos ............................. 359/565 |
| 2003/0042493 A1 * | 3/2003 | Kazakevich ................. 257/98 |

* cited by examiner

Primary Examiner—Juliana K. Kang
(74) Attorney, Agent, or Firm—Tim Headley; Gardere Wynne Sewell LLP

(57) ABSTRACT

A method of providing light includes generating white light from a plurality of white light sources, focusing the white light into beams of white light, transferring the beams of white light to a plurality of light guides to create guided beams, combining the guided beams in a main light guide to create a single combined guided beam, and emitting the single combined guided beam from the main light guide.

2 Claims, 3 Drawing Sheets

LIGHT SOURCE FIBER OPTICS

CROSS-REFERENCES TO RELATED APPLICATIONS

This application claims the benefit of the following U.S. Provisional Applications: No. 60/362,304, filed Mar. 7, 2002.

STATEMENT REGARDING FEDERALLY SPONSORED REASEARCH OR DEVELOPMENT

None.

REFERENCE TO A "SEQUENTIAL LISTING

None.

BACKGROUND OF THE INVENTION (1) Field of the Invention

The present invention relates generally to the field of lighting and, more particularly, to a method and apparatus for providing light for fiber optic lights.

(2) Description of the Related Art

Conventional fiber optic light sources typically include a single incandescent light bulb or other single projection type lamp, which contains some sort of filament, like tungsten. Light is generated as the filament is heated. Thus, continuous lighting necessarily requires continuous heating of the filament. Due to the amount of heat generated, many conventional light sources have been considered unsafe when used with fiber optic instruments. U.S. Pat. No. 5,838,860 discloses a conventional "Fiber optic light source apparatus and method". U.S. Pat. No. 5,803,575 discloses a conventional "Light generator for introducing light into optical fibers". The full disclosures of these references are incorporated herein by reference.

Another problem with conventional fiber optic light sources is the negative effect that decomposition of the filament has on the interior glass of the lamp. As the filament decomposes, a layer of material is deposited on the interior glass of the lamp. As the layer of material accumulates, the layer acts as a filter, which absorbs the light and prevents it from traveling through the lamp. This effect invariably causes a significant decrease in the quality of light generated from the light source.

Another problem with conventional fiber optic light sources is that they typically cannot be efficiently dimmed. Incandescent lamps are black body radiators, i.e., the color of the light generated depends on the temperature of the filament. As the energy level to the filament is decreased, the filament temperature decreases, and the color of the light shifts more to the red end of the spectrum, which causes the light source to lose its effective visual spectrum color potential. The red-shifted effect in turn hinders accurate identification of color.

More advanced systems for providing light include U.S. Pat. No. 6,290,382, "Fiber bundle combiner and led illumination system and method", U.S. Pat. No. 6,249,381, "Illuminating Method And Illuminating Device", U.S. Pat. No. 6,022,123, "Light source device", and U.S. Pat. No. 5,302,999, "Illumination Method, Illumination Apparatus And Projection Exposure Apparatus". The full disclosures of these references are incorporated herein by reference.

There is, therefore, a need for an improved method and apparatus for providing light that overcomes the problems discussed above.

BRIEF SUMMARY OF THE INVENTION

The present invention is a method of providing light, comprising the steps of: a) generating white light from a plurality of white light sources; b) focusing the white light into beams of white light; c) transferring the beams of white light to a plurality of light guides to create guided beams; d) combining the guided beams in a main light guide to create a single combined guided beam; and e) emitting the single combined guided beam from the main light guide.

The present invention is also a light source comprising: a) an array of white light source groups, each white light source group comprising i) a plurality of white light sources, and ii) a focus assembly optically coupled to the plurality of white light sources, wherein each white light source generates white light, and the focus assembly focuses the white light from each white light source into a beam of white light; b) a plurality of light guides coupled to the focus assemblies, wherein the one or more light guides receive the beam of white light from the focus assemblies, and generate guided beams; c) a main light guide connected to the one or more light guides of each white light source group, wherein the main light guide combines the guided beams to create a single combined guided beam; and d) an exit port coupled to the main light guide, wherein the exit port emits the single combined guided beam of white light.

Another embodiment of the present invention provides a method of providing light for an endoscope, comprising the steps of generating white light from a plurality of light emitting diodes, focusing the white light into a beam of white light, passing the beam of white light to one or more liquid light guides, and passing the beam of white light through the liquid light guides to an endoscope.

Other features and advantages of the present invention shall be apparent to those of ordinary skill in the art upon reference to the following detailed description taken in conjunction with the accompanying drawings.

DETAILED DESCRIPTION OF THE INVENTION

Figure 1:
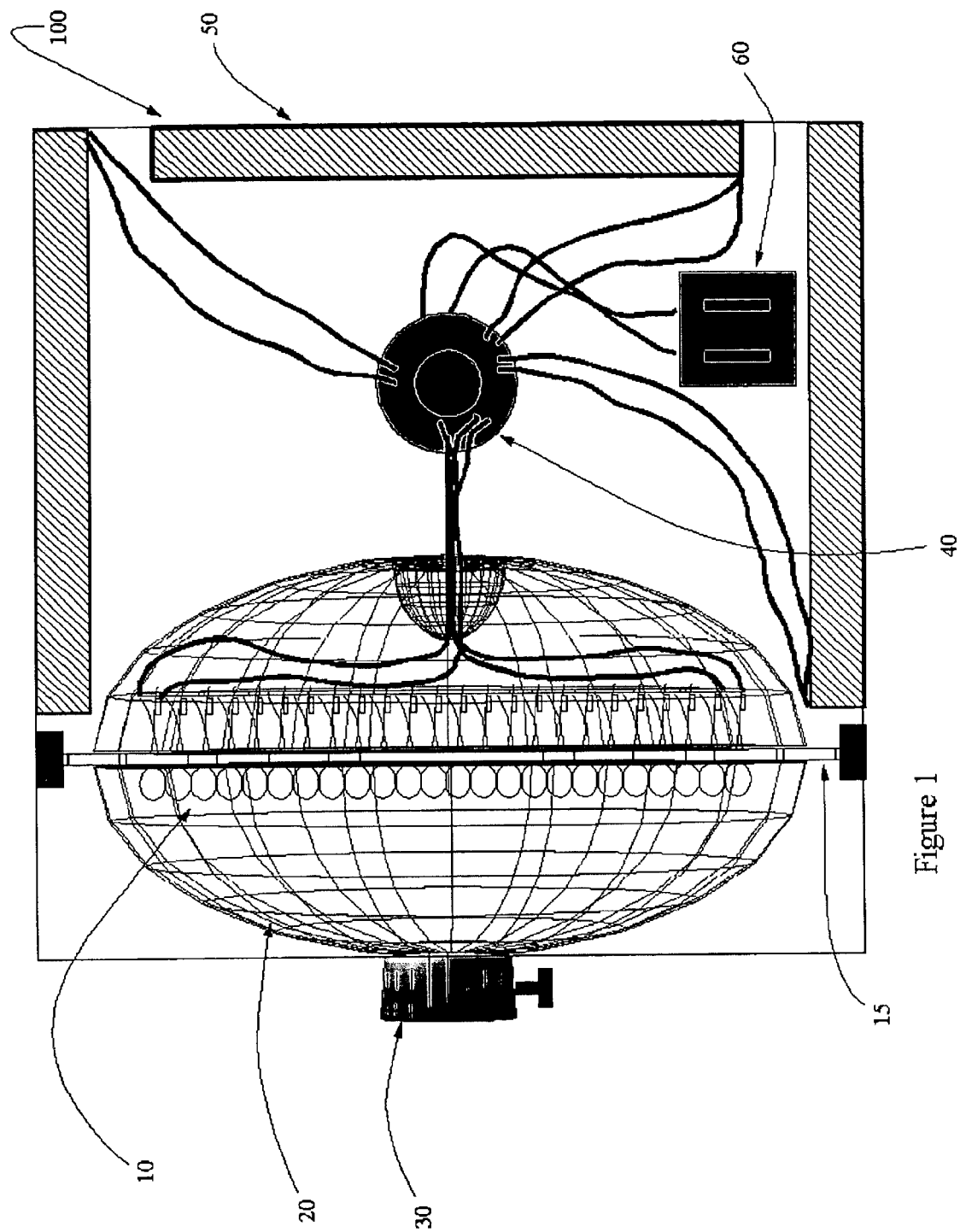
FIG. 1 is a schematic diagram of a white light source group, including light sources and a focusing assembly, in accordance with the preferred embodiment of the present invention.

In FIG. 1 a white light source group 9 includes a plurality of white light sources 10 mounted on a transparent mounting plate 15. The number of white light sources 10 in a group may range from 3 to infinity. The higher the number, the longer the group 9 will last. The white light sources 10 include light emitting diodes, sulfur fusion lamps, electrodeless lamps, krypton bulbs, microwave-activated gas bulbs, or any light sources that generate high intensity cold white light with a wavelength ranging from about 380 nanometers to about 800 nanometers, and that have low power consumption.

The white light source group 9 further includes a focus assembly 18 for focusing the white light generated from the plurality of white light sources 10 to a beam of white light.

The focus assembly 18 includes a parabolic reflector 20, and a collimating lens assembly 30, The parabolic reflector 20 couples to the transparent mounting plate 15 so as to efficiently capture the light generated from the plurality of white light sources 10. The parabolic reflector 20 concentrates the white light into a narrow and tightly focused beam. The collimating lens assembly 30 couples to the parabolic reflector 20, and further focuses the light beam. The output of the collimating lens assembly 30 can attach to an endoscope, for illuminating objects inside a body cavity, or to a bore scope or a flex scope to illuminate objects in hard-to-reach places inside an aircraft or a machine, or to a central lighting system for homes or buildings.

In accordance with another embodiment of the present invention, the focus assembly 18 comprises a fused glass-fiber optic imager. A fused glass-fiber optic imager is a fiber optic structure consisting of a multitude of tiny fibers in a variety of geometries. The tiny fibers are drawn under heat and pressure such that they are parallel to each other so that they transmit light in a well-ordered fashion. Thus, an image focused on one end is transferred fiber by fiber (pixel by pixel) to the other end.

The white light source group 9 further includes a rotary switch 40 electrically connected to each white light source 10. The rotary switch 40 controls the operation of each white light source. More specifically, the rotary switch 40 turns on or off one or more white light sources 10 to vary the intensity of the white light. In this manner, the amount of light can be easily managed without having to sacrifice the light color temperature and without having to adjust the power supplied to the light source. The white light source group 9 includes one or more batteries 50 for powering the white light source group 9, and an AC power inlet 60 for charging the batteries 50. The present invention could use other energy sources, such as flywheel batteries, dark field batteries, and solar energy sources. The white light source group 9 is enclosed and is completely sealed.

Figure 2:
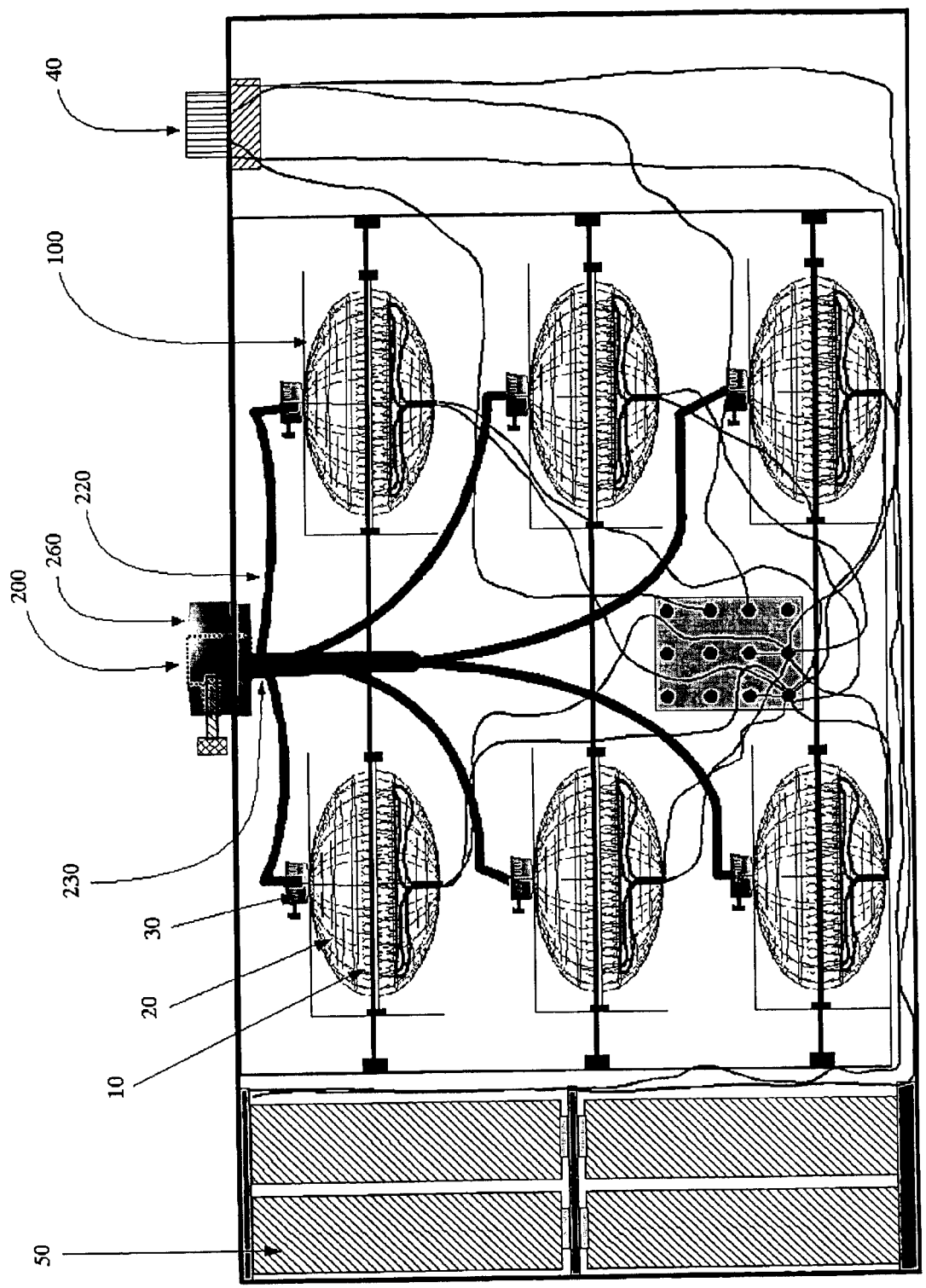
FIG. 2 is a schematic diagram of an array of white light source groups in accordance with an embodiment of the present invention.

Referring now to FIG. 2, an array 200 includes several white light source groups 9. The array 200 further includes one or more light guides 220 that receive the beam of white light from each collimating lens assembly 30 in each one of the groups 9. The light guides 220 are liquid light guides, The light guides 220 create guided beams, and transfer each guided beam of white light to a main light guide 230. The main light guide 230 is a liquid light guide that is capable of combining the light from at least six liquid light guides 220. The main light guide 230 combines all of the guided beams of white light coming from each light guide 220 to create a single combined guided beam. An exit port 260 receives the single combined guided beam of light from the main light guide 230. A user may attach a fiber optic instrument, such as an endoscope or a bore scope, at the exit port 260 to receive the beam of white light from the array 200. The exit port 260 is a glass lens, but could also be a plastic lens, which enables the array 200 to be sealed, and intrinsically safe, for hazardous areas.

The array 200 includes a rotary switch 40 and a rotary switch junction box 42 for controlling the operation of each white light source group 9. In another embodiment, each white light source group 9 has its own rotary switch, which is electrically coupled to each white light source 10 inside the group. In another embodiment, the array 200 includes a rotary switch 40 for controlling the operation of each white light source 10 within each white light source group 9.

As with the white light source group 9, the array 200 includes one or more batteries 50 for powering the array 200, and an AC power inlet (not shown) for charging the batteries 50. In another embodiment of the present invention, each white light source group 9 has its own set of batteries.

Figure 3:
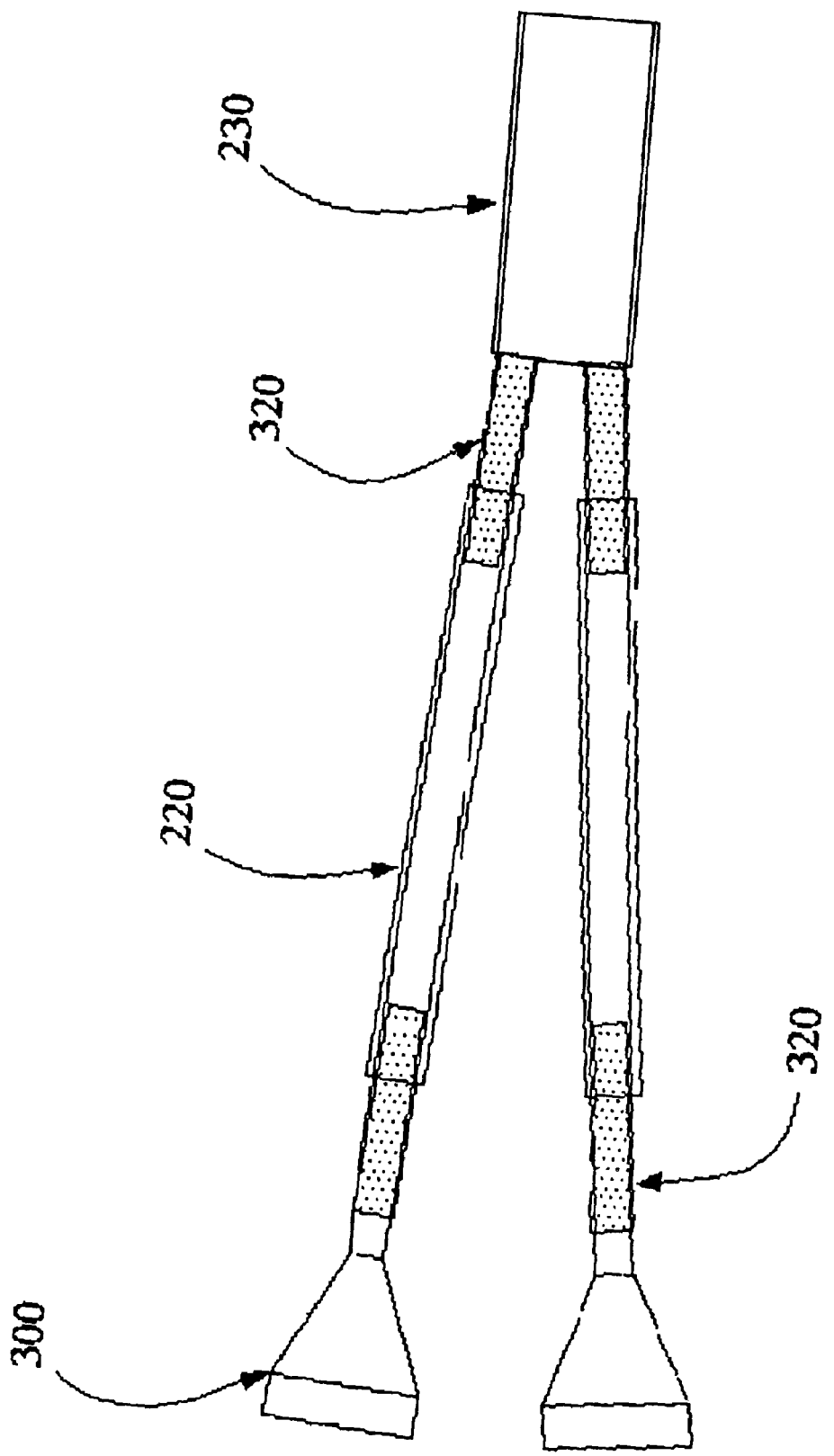
FIG. 3 is a schematic diagram of an alternate embodiment of a focus assembly.

In another embodiment, the focus assembly 18 comprises a polycarbonate imager 300, as shown in FIG. 3. The polycarbonate imager 300 captures and focuses the light from the plurality of white light sources 10. The distance between the polycarbonate imager 300 and the plurality of white light sources 10 is based on the focal length of the specific light sources, e.g., 0.1 inch to 3.5 inches. The polycarbonate imager 300 is made from a machine cast acrylic material. However, it could be made from other materials, e.g., plastic or glass. Once the light is captured and focused by the polycarbonate imager 300, the light is transferred through the liquid light guides 220, which have plugs 320 at each end. The plugs 320 are Teflon™ coated quartz end plugs. The liquid light guides 220 may be optically glued and potted into the main light guide 230.

The embodiments set forth are presented to best explain the present invention and its practical application, and to thereby enable those skilled in the art to make and utilize the invention. However, those skilled in the art will recognize that the foregoing description and examples have been presented for the purpose of illustration and example only.

The present invention has several advantages. For example, the present invention provides a light source with efficient heat dissipation. That is, the light source in accordance with the present invention reduces the amount of heat typically generated by a single high output incandescent bulb in conventional fiber optic illumination systems. By using a number of low powered white light sources arranged in a manner that generates sufficient airflow among the light sources, the present invention provides a light source that dissipates heat efficiently. The present invention, therefore, requires no cooling mechanism, e.g., cooling fan, as required in many convention fiber optic illumination systems.

The present invention further provides a light source that consumes less energy than convention fiber optic light sources. For example, an embodiment of the present invention that includes 54 3.6 volt white LED lamps assembled in six separate enclosures consumes 3.9 watts of electricity per hour. On the other hand, a "Solarc" single incandescent lamp used in a conventional illumination system typically consumes 24 watts of electricity per hour. The present invention thus provides a light source that consumes one-sixth the energy typically required by conventional fiber optic light sources.

The light source in accordance with the present invention further has a longer life span than conventional fiber optic light sources. By using a plurality of white light sources, the present invention increases the life span of the light source at least by the number of light sources in the group. This benefit provides the light source with the ability to continue to generate light even when some of the light sources are turned off or expired. For example, the present invention using a plurality of white light sources, such as, LED lamps, would typically have a life span of 10,000 hours at continuous operation, while a conventional fiber optic light source using a single incandescent lamp would typically have a life span of only 350 hours at continuous operation.

The present invention further provides consistent color temperature even when the intensity of the light is reduced. Conventional fiber optic illumination systems typically reduce the intensity of their light source by reducing the current to the light source, e.g., an incandescent lamp. When current to the light source is reduced, the temperature of the filament inside the light source is reduced. This decrease in temperature of the filament reduces the light color temperature generated by the light source. Without the proper light color temperature, the human eye, as well as CMOS and CCD cameras, will only "see" fuzzy, non-uniform illumination. The present invention, on the other hand, reduces the intensity of the light source by disconnecting the current to specific light sources or groups (enclosures) of light sources. In this manner, the present invention is able to maintain consistent color temperature throughout the operation of its light source.

The present invention also provides an efficient way to capture more light than conventional fiber optic light sources. By grouping a plurality of light sources into an array of enclosures, the present invention is able to capture a higher percentage of the generated light than conventional fiber optic light sources.

The description as set forth is not intended to be exhaustive or to limit the invention to the precise form disclosed. Many modifications and variations are possible in light of the above teaching, without departing from the spirit and scope of the following claims.

What is claimed is:

1. A method of providing light comprising:

generating white light from a plurality of white light sources;

focusing the white light into beams of white light;

transferring the beams of white light to a plurality of light guides to create guided beams;

combining the guided beams in a main light guide to create a single combined guided beam; and emitting the single combined guided beam from the main light guide;

wherein the white light sources are light emitting diodes or sulfur fusion lamps, wherein the step of focusing uses a fused glass fiber optic polycarbonate imager, wherein the step of focusing uses a parabolic reflector coupled to a collimating lens assembly, the light guides are liquid light guides, the intensity of the guided beams is varied by varying the number of the white light sources that are allowed to emit light, and the plurality of white light sources are connected to a rotary switch for controlling the operation of each white light source.

2. A light source comprising:

a. an array of white light source groups, each white light source group comprising i) a plurality of white light sources, each white light source being a light emitting diode or a sulfur fusion lamp, and for each white light source, a separate rotary switch connected to each white light source, wherein the rotary switch controls the operation of each white light source, and ii) a focus assembly comprising a parabolic reflector coupled to a collimating lens assembly, the focus assembly optically coupled to the plurality of white light sources, wherein each white light source generates white light, and the focus assembly focuses the white light from each white light source into a beam of white light;

b. a plurality of liquid light guides coupled to the focus assemblies, wherein the one or more liquid light guides receive the beam of white light from the focus assemblies, and generate guided beams;

c. a main light guide connected to the one or more liquid light guides of each white light source group, wherein the main light guide combines the guided beams to create a single combined guided beam; and d. an exit port coupled to the main light guide, wherein the exit port emits the single combined guided beam of white light;

wherein the intensity of the guided beams is varied by varying the number of the white light sources that are allowed to emit light, and the white light sources produce white light having a wavelength ranging from about 380 nanometers to about 800 nanometers.

* * * * *